United States Patent Office 3,244,699
Patented Apr. 5, 1966

3,244,699
11,18-OXIDO STEROIDS AND THE PROCESS FOR THEIR PREPARATION
Georges Muller, Nogent-sur-Marne, and Andre Poittevin, Lilas, France, assignors, by mesne assignments, to Roussel-UCLAF, S.A., Paris, France, a corporation of France
No Drawing. Filed June 27, 1960, Ser. No. 38,722
Claims priority, application France, July 17, 1959, 800,347
5 Claims. (Cl. 260—239.55)

The present invention relates to an 11,18-oxido steroid, namely 11β,18-oxido-5β-pregnane-3,20-dione of the formula:

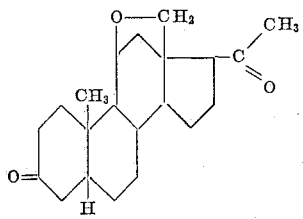

as well as the process for its preparation and the intermediates produced in its preparation.

This novel steroid is a valuable intermediate for the synthesis of aldosterone by virtue of the fact that it possesses the principal and characteristic function of this hormone, that is, the oxygenated group in the 18-position. Starting from an oxygen bridge between the 18 and 11 carbon atoms, the aldehyde group in the 18-position is obtained by chromic oxidation to the lactone, followed by a partial reduction. As to the other two functions necessary to complete the aldosterone structure, that is, the double bond in the 4-position and the hydroxyl group in the 21-position they may be introduced by classic methods, such as those leading to cortisone. A flow diagram showing the production of the 11-18 lactone of Δ⁴-pregnene-11β-ol-3,20-dione-18-oic acid, a precursor of aldosterone, is shown in Table I.

TABLE I

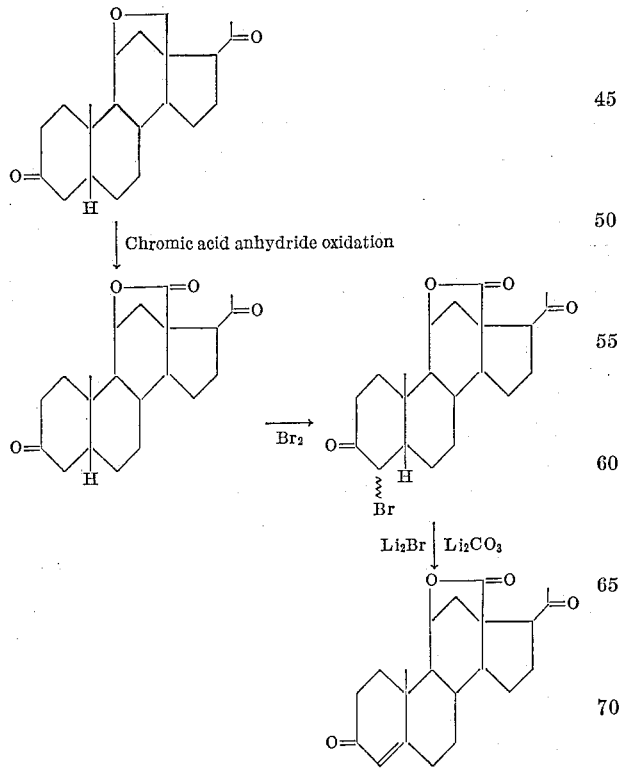

The 11β,18-oxido-5β-pregnane-3,20-dione is prepared according to the invention by starting from 3α-acetoxy-18,20β-oxido-5β-pregnane-11-one, which itself is obtained from a derivative of the bile acid series. The present invention is thus important in providing passage from the bile acid series to aldosterone.

It is an object of this invention to obtain 11β,18-oxido-5β-pregnane-3,20-dione of the formula:

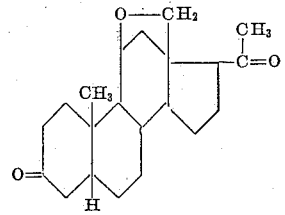

It is a further object of this invention to develop a process of producing the novel 11β,18-oxido-5β-pregnane-3,20-dione.

It is a still further object of this invention to produce the intermediate compounds:

18,20β-oxido-5β-pregnane-3α,11β-diol,
18,20β-oxido-5β-pregnane-11β-ol-3-one, and
11β,18-oxido-5β-pregnane-20β-ol-3-one.

These and further objects of the invention will become more apparent as the description thereof proceeds.

The process for the preparation of 11β,18-oxido-5β-pregnane-3,20-dione, which is the object of the present invention, may be summarized by the succession of the reactions shown in the schematic flow sheet of Table II.

TABLE II

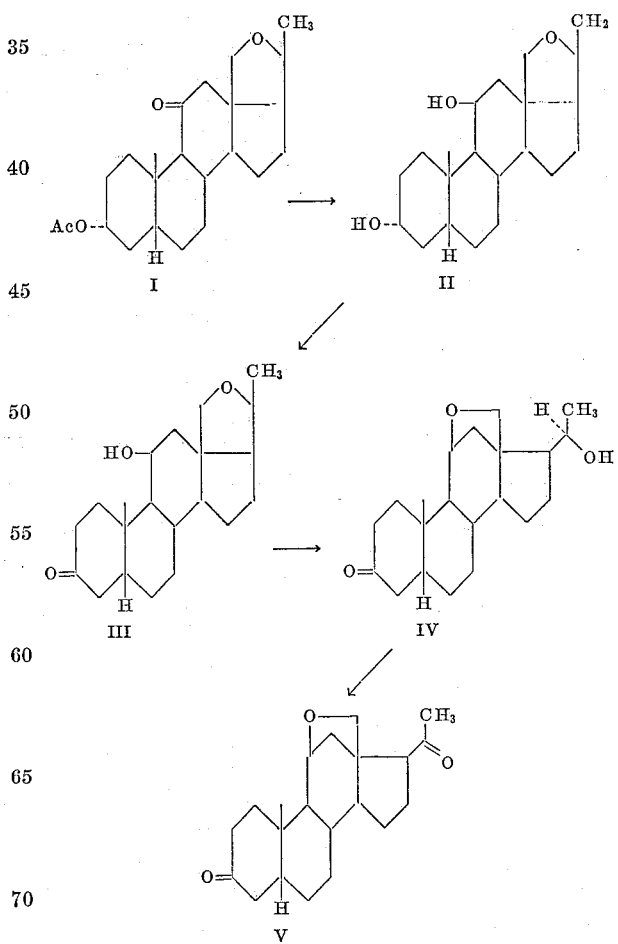

This process essentially consists of reducing, with simultaneous saponification, 3α-acetoxy-18,20β-oxido-5β-pregnane-11-one, I, into 18,20β-oxido-5β-pregnane-3α,11β-diol, II. Selective oxidation of the alcohol in the 3-position leads to 18,20β-oxido-5β-pregnane-11β-ol-3-one, III. The 18,20β-epoxide bond is opened by the action of acetic acid anhydride in the presence of a catalyst and especially in the presence of boron fluoride in accordance with the process described in the copending, commonly-assigned U.S. patent application Ser. No. 38,737, filed June 27, 1960, now U.S. Patent No. 3,037,035, followed by a treatment with an alkaline agent to give 11β,18-oxido-5β-pregnane-20β-ol-3-one, IV. The oxidation of the alcohol group in the 20-position of this latter compound leads to the desired 11β,18-oxido-5β-pregnane-3,20-dione, V.

The starting material for the invention, 3α-acetoxy-18,20β-oxido-5β - pregnane-11-one, may be prepared by oxidizing the 3-monoacetate of 5β-pregnane-3α,20β-diol-11-one by lead tetraacetate while heating to reflux in benzene, pouring the reaction mixture in an aqueous solution of sodium iodide, adding to the mixture sodium hyposulfite until the mixture is decolorized, isolating the raw oxidation product and purifying this last by chromatography on alumina.

Within the scope of the above general description, the invention may be advantageously executed in the following manner. 3α - acetoxy-18,20β - oxido-5β-pregnane-11-one, I, is reduced with an alakali metal borohydride in an aqueous inert organic solvent such as ethanol at temperatures up to the reflux temperature. The alcohol group in the 3-position of 18,20β-oxido-5β-pregnane-3α,11β-diol, II, is then selectively oxidized by the Oppenauer method by dissolving in an inert organic solvent and reacting with an aluminum alkoxide in the presence of a ketone at elevated temperatures up to the distillation temperature. The reaction is preferably carried out using a liquid hydrocarbon solvent such as toluene, aluminum isopropylate or aluminum tert. butylate and cyclohexanone. Other ketones such as acetone or quinone can also be used. The resulting 18,20β-oxido-5β-pregnane-11β-ol-3-one, III, is treated in the cold at temperatures from 0° C. to room temperature with acetic acid anhydride in the presence of a boron fluoride as a catalyst, followed by a treatment with an alkali metal hydroxide in an inert organic solvent such as ethanol at elevated temperatures up to the reflux temperature to yield 11β,18-oxido-5β-pregnane-20β-ol-3-one, IV. The alcohol group in the 20-position is oxidized with chromic acid anhydride in pyridine to obtain the desired 11β,18-oxido-5β-pregnane-3,20-dione, V.

The following examples disclose specific embodiments of the invention. It is to be readily understood by one skilled in the art that alternative procedures may be employed and that the specific procedures shown are illustrative only and not to be deemed limitive.

The melting points are instantaneous melting points determined on a Kofler block. The temperatures are given in degrees centigrade.

*Example I.—Preparation of 3α-acetoxy-18,20β-oxido-5β-pregnane-11-one*

5 grams of the 3-monoacetate of 5β-pregnane-3α,20β-diol-11-one, M.P. 204° C. were introduced into 200 cc. of benzene. 10 cc. of solvent were distilled off, 10 grams of lead tetraacetate were added and the mixture was refluxed for 16 hours. It was poured into 200 cc. of water containing 10 grams of sodium iodide and solid sodium hyposulfite was added until the mixture was decolorized. The mixture was decanted and extracted with ether. The ether extracts were separated, combined, washed with water, with sodium bicarbonate, dried over magnesium sulfate and evaporated to dryness under vacuum. 6 grams of a resin were recovered which were chromatographed on 150 grams of neutral alumina. Elution was effected with petroleum ether containing 2% of methylene chloride. There was obtained 3.31 grams of a resin which on crystallization from petroleum ether furnished 1.42 grams of 3α-acetoxy-18,20β-oxido-5β-pregnane-11-one, having a melting point of 168° C. and a specific rotation $[\alpha]_D^{20} = +67° \pm 5$ (CHCl$_3$). The product which has not yet been described is present in the form of small, colorless crystals, insoluble in water, soluble in alcohol, ether, acetone, benzene and chloroform, poorly soluble in petroleum ether.

*Analysis.*—$C_{23}H_{34}O_4$; molecular weight=374.50. Calculated: C, 73.76%; H, 9.15%; O, 17.09%. Found: C, 73.8%; H, 9.2%; O, 17.5%.

*Example II.—Preparation of 11β,18-oxido-5β-pregnane-3,20-dione, V*

(a) *Prepration of 18,20β-oxido-5β-pregnane-3α,11β-diol, II.*—2 grams of 3α-acetoxy-18,20β-oxido-5β-pregnane-II-one, I, prepared according to Example I, were dissolved in a mixture consisting of 16 cc. of ethanol and 4 cc. of water by heating. 2 grams of potassium borohydride were introduced into the ethanolic solution of compound I and the resulting reaction mixture was refluxed for three hours and a half. Thereafter the 18,20β-oxido-5β-pregnane-3α,11β-diol, II, formed thereby was precipitated by the addition of water, separated by vacuum filtration, washed with water and dried to recover 1.61 grams (90% of theory) of the product having a melting point of 270° C.

For analysis, the diol II was recrystallized from methylene chloride to give a product having a melting point of 270–272° C. and a specific rotation $[\alpha]_D^{20} = +66°$ (c.=0.5% in ethanol). The diol II is very slightly soluble in benzene and chloroform and insoluble in ether.

*Analysis.*—$C_{21}H_{34}O_3$; molecular weight=334.48. Calculated: C, 75.4%; H, 10.25%; O, 14.35%. Found: C, 75.6%; H, 10.2%; O, 14.3%.

The infra-red spectrum confirms the absence of a carbonyl grouping. The product II is not described in the literature.

(b) *Preparation of 18,20β-oxido-5β-pregnane-11β-ol-3-one, III.*—1.6 grams of compound II were suspended in 80 cc. of toluene. The suspension was heated until the solvent began to be distilled off, and then 0.8 gram of aluminum isopropylate in 32 cc. of toluene and 13 cc. of cyclohexanone were added over a period of half an hour. Distillation was continued for an additional ten minutes. The reaction mixture was then cooled and 80 cc. of water were added. The reaction mixture was acidified to a pH of 1 with concentrated hydrochloric acid and the upper phase was decanted. The aqueous solution was extracted with methylene chloride and the extracts were combined, washed with water, with a solution of sodium bicarbonate and again with water. The extract solution was then dried over magnesium sulfate and the solvents were driven off in vacuo. The residue was recrystallized from ether to recover 1.072 grams (67% of theory) of 18,20β-oxido-5β-pregnane-11β-ol-3-one, III, having a melting point of 172° C. The ketone III was usable without further purification for the subsequent operations.

For analysis, it was recrystallized from ether to yield a sample melting at 174° C., specific rotation $[\alpha]_D^{20} = +52°$ (c.=0.5% in chloroform). It is obtained in the form of prismatic crystals which are very soluble in acetone, benzene and chloroform and slightly soluble in ether.

*Analysis.*—$C_{21}H_{32}O_3$; molecular weight=332.47. Calculated: C, 75.86%; H, 9.7%. Found: C, 75.9%; H, 9.7%.

The infra-red spectrum confirms the indicated structure. Product III is not described in the literature.

(c) *Preparation of 11β,18-oxido-5β-pregnane-20β-ol-3-one, IV.*—1.9 grams of compound III were admixed with 3.8 cc. of acetic acid anhydride, the mixture was cooled to 3° C., and then 0.2 cc. of the complex of boron fluoride with two molecules of acetic acid were introduced into the mixture. After allowing the resulting mixture to stand for fifteen minutes at 5° C., 20 cc. of water were added and the reaction mixture was agitated for an hour and a half at room temperature. Thereafter the reaction mixture was extracted with methylene chloride. The extracts were combined, washed with water, with a solution of sodium bicarbonate and again with water, dried and evaporated to dryness.

The residue was redissolved in 20 cc. of ethanol, 1.2 cc. of a concentrated solution of sodium hydroxide were added and the mixture was refluxed for one hour. After addition of 100 cc. of water, the solution was extracted with methylene chloride. The extracts were combined, washed with water, dried and evaporated to dryness. The residue crystallized from isopropyl ether and yielded 1.071 grams (56% of theory) of 11β,18-oxido-5β-pregnane-20β-ol-3-one, IV, having a melting point of 219° C. The product was recrystallized, for analysis, from ether and had a melting point of 220° C. and a specific rotation $[\alpha]_D^{20} = +50°$ (c.=0.5% in chloroform). It is very soluble in acetone, benzene and chloroform and slightly soluble in ether.

*Analysis.*—$C_{21}H_{32}O_3$; molecular weight=332.47. Calculated: C, 75.86%; H, 9.7%. Found: C, 75.2%; H, 9.7%.

The infra-red spectrum confirmed the expected structure. Product IV is not described in the literature.

(d) *Preparation of 11β,18-oxido-5β-pregnane-3,20-dione, V.*—100 mg. of chromic acid anhydride were dissolved at 5° C. in 1 cc. of pyridine, and then a solution of 100 mg. of compound IV in 1 cc. of pyridine was added. The reaction mixture was allowed to stand for sixteen hours at room temperature. After adding 10 cc. of methylene chloride, the reaction mixture was vacuum filtered. The filtrate was washed successively with 2 N hydrochloric acid, with water, with a saturated solution of sodium bicarbonate and again with water, dried and concentrated in vacuo. The residue crystallized from ether and yielded 50 mg. of 11β,18-oxido-5β-pregnane-3,20-dione, V, having a melting point of 162° C. and a specific rotation, $[\alpha]_D^{20} = +100°$ (c.=0.5% in chloroform). The product is obtained in the form of rectangular prisms which are very soluble in acetone, benzene and chloroform and soluble in ether.

*Analysis.*—$C_{21}H_{30}O_3$; molecular weight=330.45. Calculated: C, 76.3%; H, 9.1%; O, 14.5%. Found: C, 76.4%; H, 9.1%; O, 14.2%.

The infra-red spectrum reveals the presence of a ketone group attached in the 3-position and of a methyl ketone group attached in the 17-position.

Compound V is not described in the literature.

It is to be understood that the invention is not limited to the specific embodiments of the examples described above. More particularly, it is possible to use equivalent techniques known to those skilled in the art without departing from the spirit of the present invention or the scope of the appended claims.

We claim:
1. A compound having the formula:

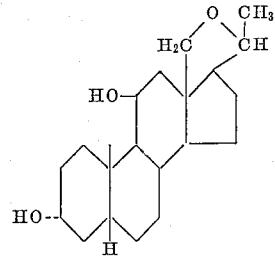

2. A compound having the formula:

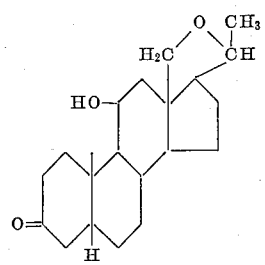

3. 11β,18-oxido-5β-pregnane-20β-ol-3-one.
4. 11β,18-oxido-5β-pregnane-3,20-dione.
5. The process of producing 11β,18-oxido-5β-pregnane-3,20-dione which comprises the steps of reacting 3α-acetoxy-18,20β-oxido-5β-pregnane-11-one with an alkali metal borohydride, oxidizing the 18,20β-oxido-5β-pregnane-3α,11β-diol by the Oppenauer method, reacting the 18,20β-oxido-5β-pregnane-11β-ol-3-one with acetic acid anhydride in the presence of boron fluoride, alkalizing the reaction product with an alkali metal hydroxide, oxidizing the 11β,18-oxido-5β-pregnane-20β-ol-3-one with chromic acid anhydride and recovering said 11β,18-oxido-5β-pregnane-3,20-dione.

References Cited by the Examiner

Heusler et al.: Experientia 16, 21–24, Jan. 15, 1960.

LEWIS GOTTS, *Primary Examiner.*

L. H. GASTON, MORRIS LIEBMAN, *Examiners.*

M. L. WILLIAMS, *Assistant Examiner.*